US007987238B2

(12) United States Patent
Hook et al.

(10) Patent No.: US 7,987,238 B2
(45) Date of Patent: Jul. 26, 2011

(54) MANAGING CONTENT REMOTELY ON A DEVICE

(75) Inventors: Jerry P. Hook, Bothell, WA (US); Jerry Alan Johnson, Medina, WA (US); Paul S. Hellyar, Redmond, WA (US); Shyam Krishnamoorthy, Kirkland, WA (US); Simon P. Attwell, Kirkland, WA (US)

(73) Assignee: Microsoft Corporation, Redmond, WA (US)

( * ) Notice: Subject to any disclaimer, the term of this patent is extended or adjusted under 35 U.S.C. 154(b) by 363 days.

(21) Appl. No.: 11/731,041

(22) Filed: Mar. 30, 2007

(65) Prior Publication Data
US 2008/0244033 A1   Oct. 2, 2008

(51) Int. Cl.
G06F 15/16 (2006.01)
(52) U.S. Cl. ........ 709/217; 219/203; 219/223; 219/226; 219/225; 219/232
(58) Field of Classification Search .................. 709/223, 709/226, 232, 225, 219, 203
See application file for complete search history.

(56) References Cited

U.S. PATENT DOCUMENTS

| 6,507,727 | B1 | 1/2003 | Henrick ........................ 455/3.06 |
| 6,928,261 | B2 | 8/2005 | Hasegawa et al. ............ 455/3.01 |
| 6,965,770 | B2 | 11/2005 | Walsh et al. ................. 455/426.1 |
| 7,139,372 | B2 | 11/2006 | Chakravorty et al. ... 379/114.01 |
| 2002/0049037 | A1 | 4/2002 | Christensen et al. ......... 455/3.06 |
| 2003/0110214 | A1 | 6/2003 | Sato .............................. 709/203 |
| 2003/0135643 | A1* | 7/2003 | Chiu et al. .................... 709/238 |
| 2004/0024688 | A1 | 2/2004 | Bi et al. ........................... 705/37 |
| 2004/0054787 | A1 | 3/2004 | Kjellberg et al. ............. 709/228 |
| 2004/0267790 | A1* | 12/2004 | Pak et al. ....................... 707/100 |
| 2005/0204389 | A1* | 9/2005 | Proehl et al. .................... 725/60 |
| 2006/0004630 | A1* | 1/2006 | Criddle et al. .................. 705/14 |
| 2006/0031551 | A1 | 2/2006 | Agresta et al. ................ 709/231 |
| 2006/0085271 | A1 | 4/2006 | Tokita et al. .................... 705/26 |
| 2006/0155790 | A1* | 7/2006 | Jung et al. ..................... 707/205 |
| 2006/0168123 | A1* | 7/2006 | Krstulich ....................... 709/219 |
| 2006/0168231 | A1* | 7/2006 | DiPerna ........................ 709/226 |
| 2006/0173704 | A1* | 8/2006 | Hair et al. ......................... 705/1 |
| 2006/0179155 | A1* | 8/2006 | Bunting et al. ............... 709/232 |
| 2006/0271636 | A1 | 11/2006 | Balasuriya .................... 709/217 |

FOREIGN PATENT DOCUMENTS

EP   1109369 A2 *   6/2001

OTHER PUBLICATIONS

Cranor, C.D. et al., "Design and Implementation of a Distributed Content Management System", NOSSDAV, 2003, http://delivery.acm.org, 4-11.
Davidyuk, O. et al., "Context-Aware Middleware for Mobile Multimedia Applications", MUM, 2004, http://delivery.acm.org, 8 pages.

* cited by examiner

Primary Examiner — Nathan Flynn
Assistant Examiner — Khaled Kassim
(74) Attorney, Agent, or Firm — Woodcock Washburn LLP

(57) ABSTRACT

An on-line service manages downloads of digital content in response to user requests. User requests to download digital content include parameters defining conditions for downloads. Parameters may define the device to which the requested content is to be downloaded and the time that the download is to take place. The requests and related parameters are maintained in a queue which may be centrally managed and maintained. The queue is monitored and downloads executed consistent with the user-specified parameters. Digital content is downloaded to devices other than from which the request was made and at times specified by the user.

12 Claims, 6 Drawing Sheets

MANAGING CONTENT REMOTELY ON A DEVICE

CROSS REFERENCE TO RELATED APPLICATIONS

This application is related by subject matter to U.S. patent application Ser. No. 11/731,045 titled "Buy Once Play Anywhere" filed on even date herewith, the contents of which are hereby incorporated by reference in their entirety.

BACKGROUND

Information that traditionally has been distributed on physical media is now commonly distributed in electronic form via electronic networks. For example, information that has traditionally appeared in printed books, magazines, and newspapers, is now distributed electronically via the Internet and World Wide Web ("Web"). Home video games, which traditionally have been distributed using physical cartridges, compact disks (CDs), and/or digital video disks (DVDs), are now distributed electronically at services such as, for example, MICROSOFT® XBOX Live (www.xbox.com), that are accessible via the Internet. Similarly, music recordings, which traditionally have been distributed using CDs and other physical media, are now distributed electronically via Internet services such as, for example, MICROSOFT® Zune Marketplace (www.zune.net). Indeed, entertainment content of all types—motion pictures, photographs, music recordings, novels, articles, etc.—which traditionally have been distributed on physical media are candidates to be distributed electronically at services accessible via electronic networks.

Existing on-line services typically download digital content to the electronic device from which the request for digital content was made. For example, when a gaming console user requests to download digital content from an on-line service, the requested digital content, which may be a game, video, music, etc., is downloaded to the gaming console from which the request was made. Similarly, when a user of a portable media player requests to download digital content, the data is downloaded to the media player associated with the request.

Conventionally, digital content downloads from on-line services begin upon activation by the user at the requesting device. The length of time required for a particular download varies depending upon the size of the digital content item and the availability of bandwidth. If more than one content item is requested, the queuing of requests is generally directed at the requesting device. Typically, the requests are queued and downloaded in the order that they were entered.

SUMMARY

In the subject matter described herein, an on-line service manages distribution of digital content.

The illustrative service maintains a queue or database of requests for digital content. The queue comprises, for each requested digital content item, parameters for downloading the requested digital content. The parameters may specify conditions or characteristics associated with the requested download. For example, the parameters may define that the requested download is to be made to a particular device or machine, or may define that the requested download is to be made at a particular time or during a particular period of time.

The on-line service receives requests for digital content from computing devices via a communications network. Upon receiving a request for a digital content item, the service identifies the user that made the request, the content item requested, and any parameters associated with the requested download including, for example, the device to which the content is to be downloaded and a time for the download. The service updates the queue to reflect the newly received request. The service monitors the queue and downloads the requested content items consistent with the parameters specified in the request.

This Summary is provided to introduce a selection of concepts in a simplified form that are further described below in the Detailed Description of Illustrative Embodiments. This Summary is not intended to identify key features or essential features of the claimed subject matter, nor is it intended to be used to limit the scope of the claimed subject matter. Other features are described below.

BRIEF DESCRIPTION OF THE DRAWINGS

The foregoing summary and the following additional description of the illustrative embodiments may be better understood when read in conjunction with the appended drawings. It is understood that potential embodiments of the disclosed systems and methods are not limited to those depicted.

DETAILED DESCRIPTION OF ILLUSTRATIVE EMBODIMENTS

Overview

Figure 1:
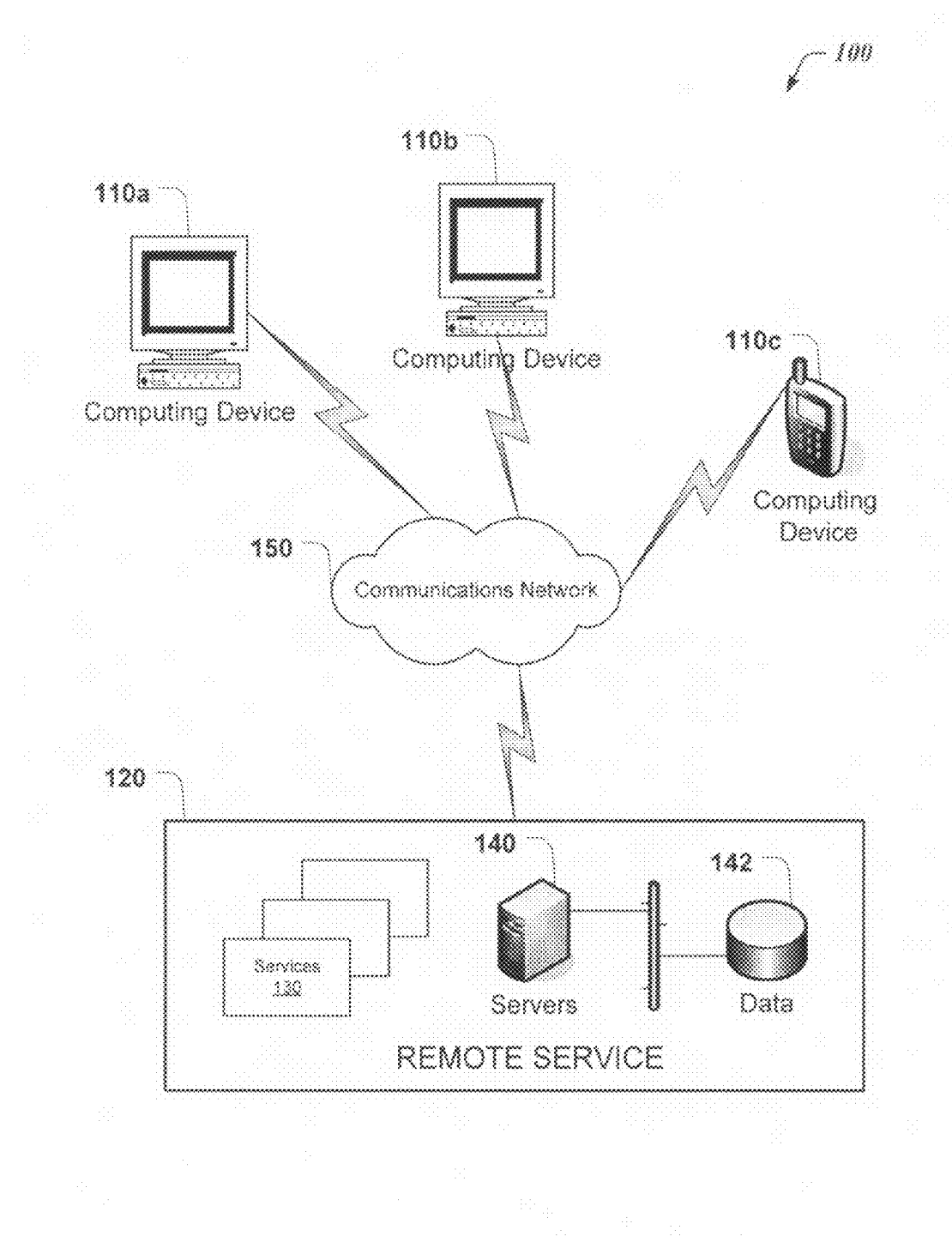
FIG. 1 is a block diagram of an illustrative computing arrangement in which aspects of the subject matter described herein may be implemented.

In connection with existing on-line services for downloading digital content, the user is typically required to be present at the digital device in order to activate a download. The downloading of digital content from the service to the requesting device begins synchronously upon initiation of the request for download. The user, because he or she must initiate the request, as a practical matter is required to be present at the device for the download.

In connection with existing services, while a user may need to be present at the device in order to initiate the request, the user may also have only limited use of the electronic device while the download is proceeding. For example, it is often the case that users request to download content items that comprise a very large amount of data such as high density (HD) format videos and HD video games. Large digital content items require significant time—sometimes hours—to download. Large amounts of computing resources such as processor cycles and communication bandwidth may be devoted to the download. As a result, there are less computing resources available for the user to direct to other activities. For example, during the time that a HD video game is being downloaded to a gaming console, the user may not be able to use the gaming console to play games that require significant use of Internet communication. Thus, in connection with existing services for downloading digital content, not only is the user required to be present in order to activate the download, but the user may be limited in his or her use of the digital device during the download.

Existing on-line services typically are limited to downloading the requested digital content to the electronic device from which the request was made. For example, when a user of a digital media player such as, for example, a MICROSOFT® Zune device, request to download digital content from a service such as Zune Marketplace, the requested digital content is downloaded to the device from which the request was made. Similarly, when a gaming console user requests to download digital content from an on-line service, the requested digital content, which may be a game, video, music, etc., is downloaded to the gaming console from which the request was made. Thus, in connection with existing services for downloading digital content, the user is limited to downloading to the digital device associated with the request.

The subject matter described herein is directed to an on-line service for remotely managing the distribution of digital content. The service allows users to request downloads to devices other than the device from which the request was made and to schedule the download for periods during which the target device does not receive heavy use.

In an illustrative on-line service for managing the distribution of digital content, user requests to download digital content are received, for example, via the Internet. The requests may include parameters that define conditions or characteristics for the download. For example, the parameters for an illustrative request may specify that the requested digital content item is to be downloaded to a particular mobile media player, even though the request was initiated from a gaming console or personal computer. In another illustrative example, the parameters may specify that the download of the requested content item is to be made to a particular gaming console during early morning hours when the console is typically not being used and bandwidth is plentiful.

The illustrative on-line service maintains a queue of requests that have been received. As new requests are received, they are added to the queue. The queue includes for each request any parameters that were defined by the user for the request.

The on-line service monitors the queue of requests and downloads the requested digital items consistent with the parameters specified for the requests. For example, if the parameters associated with a particular digital content request define that the digital content item is to be downloaded on a particular date at a particular time, the on-line service will perform the download on the specified data and at the specified time. Similarly, if the request specified that the requested content item is to be downloaded to a particular digital device, even though the request was initiated from another device, the requested content item is downloaded to the requested device.

Example Computing Arrangement

FIG. 1 illustrates an exemplary computing network 100 suitable for remotely managing digital content distribution. Remote service 120 may offer a number of different functions including remote management content distribution. Users employ computing devices 110a-c to access remote service 120 via communications network 130.

In an exemplary environment, remote service 120 provides access to a plurality of functional services, one of which is remote content distribution management 130. Additional functional services that may be offered by remote service 120 comprise, for example, browsing for digital content items available for download, voice/chat, friends lists, matchmaking, roaming, feedback, tournaments, voice messaging, content updates, etc. The functional services are operated on computing servers 140 and communicate with data stores 142, which may be accessed locally or remotely. Any number of servers 140 and data stores 142 may be used to provide a functional service such as that for remote content distribution management 130 described herein.

Remote service 120 is accessible via communications network 150. Communications network 150 may be any type of network that is suitable for providing communications between computing devices 110a-c and remote service 120. Moreover, communications network 150 may comprise a combination of discrete networks which may use different technologies. For example, communications network 150 may comprise local area networks (LANs), wide area networks (WAN's), or combinations thereof. Communications network 150 may comprise wireless, wireline, or combination thereof. In an exemplary embodiment, communications network 150 comprises the Internet and may additionally comprise any networks adapted to communicate with the Internet.

Persons that wish to access remote service 120 and, in particular remote content distribution services 130, may do so using computing devices 110a-c. Computing devices 110a-c may be any type of device that is operable to communicate with remote service 120. For example, computing devices 110a-c may be personal computers, game consoles, handheld computing devices, media players, wireless phones, personal digital assistants, etc. While only three devices are illustrated in FIG. 1, it is understood that remote service 120 and functional services 130 may be accessed via any number of computing devices 110a-c.

Computing arrangement 100 may employ a host of network topologies such as client/server, peer-to-peer, or hybrid architectures. The "client" is a member of a class or group that uses the services of another class or group to which it is not related. Thus, in computing, a client is a process (i.e., roughly a set of instructions or tasks) that requests a service provided by another program. The client process utilizes the requested service without having to "know" any working details about the other program or the service itself. In a client/server architecture, particularly a networked system, a client is usually a computing device, such as one of devices 110a-c, that accesses shared network resources provided by another computer (i.e., a server). A server, such as device 140, is typically a remote computer system accessible over a remote network such as the Internet. The client process may be active in a first computer system, and the server process may be active in a second computer system, communicating with one another over a communications medium and allowing multiple clients to take advantage of the information-gathering capabilities of the server.

Clients and servers communicate with one another utilizing the functionality provided by a protocol layer. For example, Hypertext-Transfer Protocol (HTTP) is a common protocol that is used in conjunction with the World Wide Web (WWW) or, simply, the "Web." Typically, a computer network address such as a Uniform Resource Locator (URL) or an Internet Protocol (IP) address is used to identify the server or client computers to each other. Communication among computing devices is provided over a communications medium. In particular, the client and server may be coupled to one another via TCP/IP connections for high-capacity communication.

Figure 2:
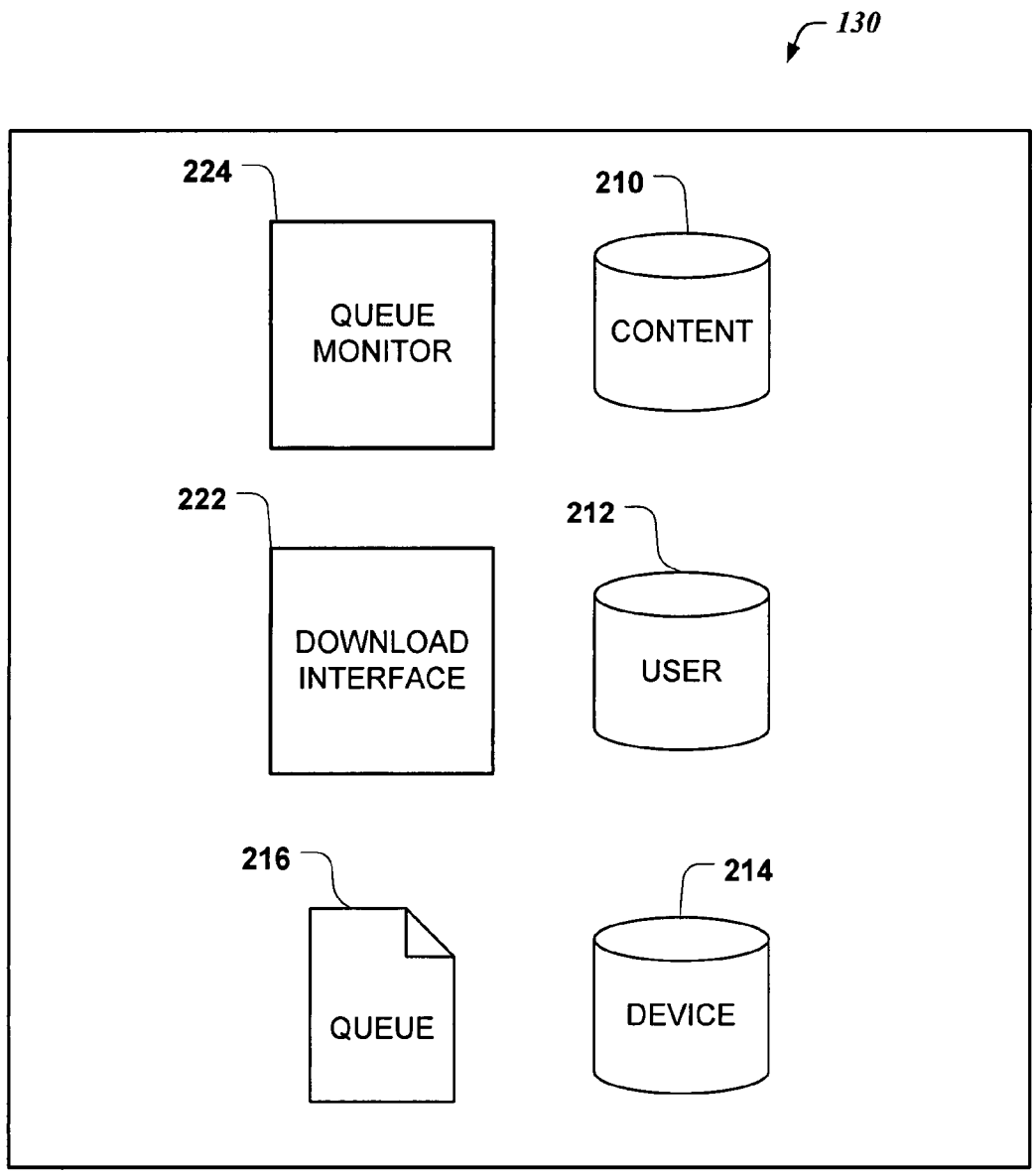
FIG. 2 is a block diagram depicting logical components of an illustrative service for managing distribution of digital content.

FIG. 2 depicts a block diagram of exemplary logical components of an illustrative service 130 for remotely managing the downloading of digital content. Illustrative service 130 comprises or has access to digital content store or database 210 that is available for download. Content store 210 may comprise any type of digital content that users may wish to retrieve electronically. This may include, for example, video games, recorded music, video, photographs, pictures, recorded sounds, novels, articles, etc. In an illustrative embodiment, content store 210 may also comprise placeholders for digital content that is scheduled or anticipated, but which is not yet available. For example, a movie or a video game that is expected to be released in the near future may have a placeholder in digital content store 210. Users may request that the anticipated content item be downloaded when released and received into the system. Users may use service 130 to subscribe to anticipated content and direct that it be downloaded to a particular device upon release.

Content store 210 may comprise an index of the various content items for purposes of retrieving particular digital content items. Content store 210 may be stored, for example, in database software so as to be readily accessible. The database may make use of any suitable technology such as relational and object databases and may employ any of the commercially available database software such as MICROSOFT® SQL.

Functional service 130 for managing content distribution comprises user database 212. User database 212 comprises information about users that are authorized to manage the distribution of digital content via service 130. Information regarding users that is stored in database 212 may include, for example: the person's name; address; billing information such as credit card information; and the digital devices to which the user may download digital content.

Device database 214 comprises information about devices that are registered with the service and to which data may be downloaded. For example, database 212 may comprise for device: a unique identifier; the type(s) of content readable by the device; the format of the content suitable to be downloaded to the device; a communication path with the device; a storage location on the device at which data should be stored; preferred times for downloading data to the device; users that may use the device; etc. Databases 214 and 212 may make use of any suitable technology such as relational and object databases and may employ any of the commercially available database software such as, for example, MICROSOFT® SQL.

Queue 216 comprises information regarding the requests to download digital content that have been made to service 130. For example, queue 216 may comprise for each request: a unique identifier for the request; the content item requested for downloaded; the person making the request; the device from which the request was made; the parameters associated with the request; and the status of the request. Parameters associated with the request comprise information that defines conditions and/or characteristics for downloading data. For example, the parameters for a request may define when the requested content item is to be downloaded—whether it be on a particular day, a particular time of day, during a particular window or interval of time, when certain conditions exist on the target device, and/or when certain conditions exist in the network. The request parameters also specify, for example, particular device(s) to which the requested content item is to be downloaded. For example, the request parameters may define that the content item is to be downloaded to a particular media player, game console, digital phone, and/or computer.

In an example embodiment, queue 216 may comprise entries for digital content that is expected to be released in the future. Parameters associated with such requests may define that the content is to be downloaded when the requested content is released and available through service 130.

Queue 216 may be stored in any format that is suitable for tracking request information. Queue 216 may be stored in, for example, a relational database, in a data structure stored in random access memory, a combination of the two, or any other suitable format. It is understood that the requests recorded in queue 216 may be accessed and processed without regard to when the request was received and placed in queue 216. Queue 216 may be managed and maintained centrally by service 130.

Download interface server 222 operates as an interface for users to input new requests for content items and to modify existing requests. Server 222 updates queue 216 in response to user inputs and may access user database 212 and device database 214 as needed. For example, upon receiving a new request to download a digital content item, download interface server 222 updates queue 216 to reflect the new request including all related information such as any parameters. Similarly, server 222 receives user inputs to modify previously entered requests for downloads and responds by updating queue 216 accordingly. For example, if a user should request to modify the originally requested time for a download, server 222 updates queue 216 to reflect the new time.

Users at computing devices 110a-c may access download interface server 222 in any number of ways. Download interface server 222 may comprise a World Wide Web server and be accessible to users of devices 110a-c with access to the Web and Web browsing software. Download interface server 222 may also be accessible via an application programming interface ("API"). Users of computing devices 110a-c may invoke software applications which make use of the API to communicate requests to download interface server 222.

Queue monitor server 224 monitors queue 216 for requests that are prepared for download. In other words, queue monitor server 224 is programmed to respond to any conditions that have been placed on a particular request for digital content. For example, a request in queue 216 may have been defined to take place at a particular time or period of time. Queue monitor server 224 identifies when the defined time arrives and downloads the requested content item from content database 210 consistent with the download parameters that were defined by the user and stored in queue 216. Similarly, if the request parameters specify that that the download was to take place the next time that a particular device initiates communication with the service, queue monitor server 224 will initiate the download upon the specified device communicating with the service. If the request parameters specify that the download is to take place upon release of the requested content item, queue monitor server 224 will coordinate the download upon receipt of the requested content item. Queue monitor server 224 may be maintained and operated centrally by service 130, but may also be implemented using distributed designs.

Managing Content Distribution Method

Figure 3:
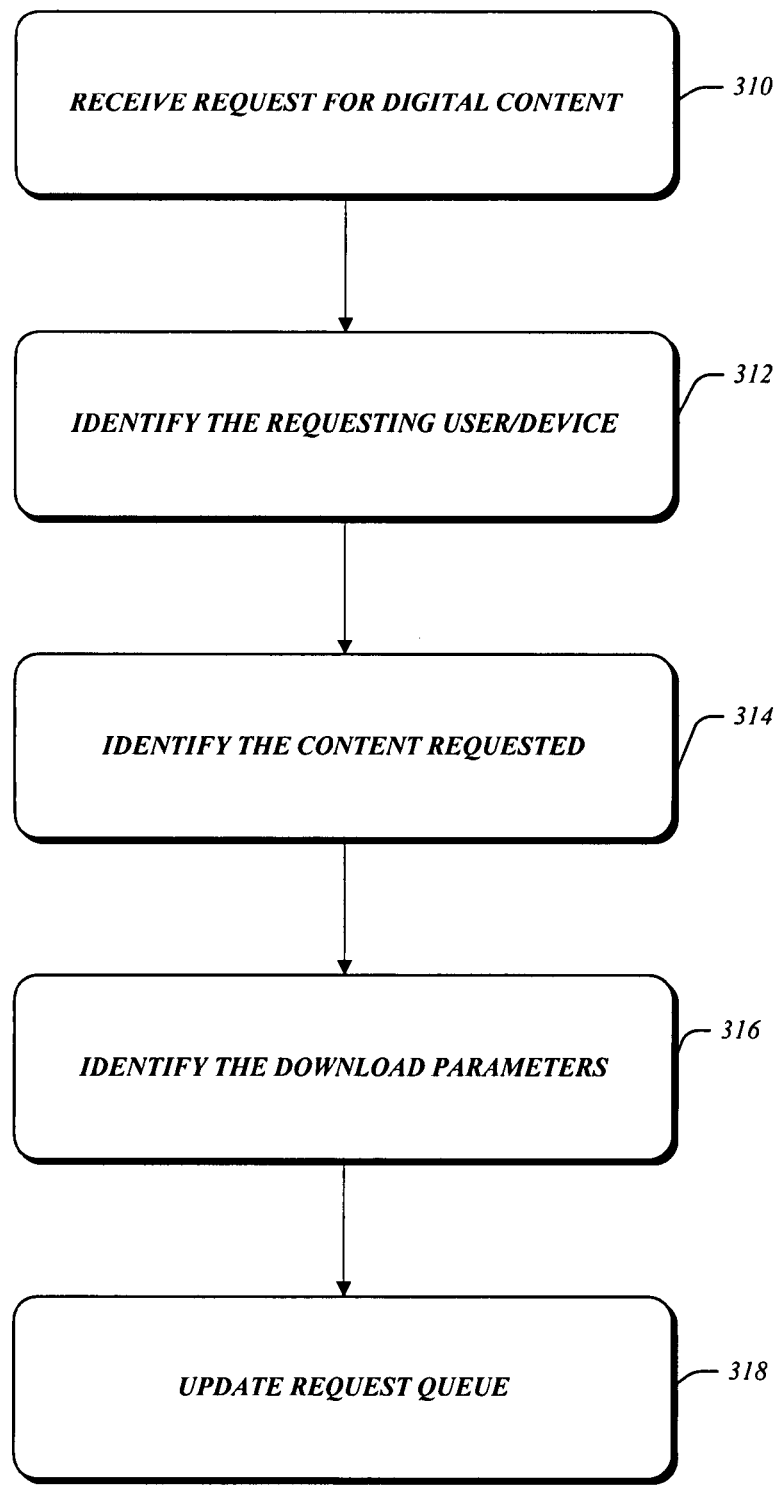
FIG. 3 is a flow diagram of a process for receiving requests to download digital content items.

FIG. 3 is a flowchart of an example process for receiving a request for downloading digital content. At step 310, download interface server 222 receives a request for a digital content item. The request may comprise various information about the request and the source of the request.

At step 312, download interface server 222 parses the request and identifies the user that initiated the request and the device from which the request was made. In an illustrative embodiment, the requesting user and device are registered with the service and have associated unique identifiers which may be stored in databases 212 and 214 respectively. Server 222 may reference databases 212 and 214 in connection with parsing the request to identify the requesting user and device.

At step 314, download interface server 222 parses the request and/or interfaces with the user to identify the content item requested. The content item may be identified, for example, by a unique identifier that refers to a specific content item in content database 210. As part of the process of making a request, the user may have previously identified and selected a particular content item using a functional service that provides users the ability to browse items in content database 210. The unique identifier identified in the request may be referenced against digital content 210 in order to identify the particular item that has been requested.

At step 316, download interface server 222 parses the request and/or interfaces with the user to identify any download parameters that are associated with the request. The parameters specify any conditions, requirements, and/or characteristics of the download that is to take place. The request parameters may specify that the requested content item is to be downloaded to a particular device. For example, the request parameters may define that the content item is to be downloaded to a particular media player, game console, digital phone, and/or computer. The parameters for a request may also define when the requested content item is to be downloaded—whether it be on a particular day, a particular time of day, during a particular window or interval of time, when certain conditions exist on the target device, e.g., the device is not being used, when the target device initiates communication with the service, and/or when certain conditions exist in the network. For example, the parameters may specify that the download may proceed upon determining that the available client resources are sufficient. Client resources may include, for example, communication bandwidth, processing capacity, etc. Client resource available may be optimal for downloading during off-peak hours.

At step 318, download interface server 318 updates queue 216 with the new request. Download interface server 318 may assign a new unique identifier to the request and store it with the information relating to the request in queue 216. The information stored in relation to the request includes any parameters including the device to which the content is to be downloaded.

Figure 4:
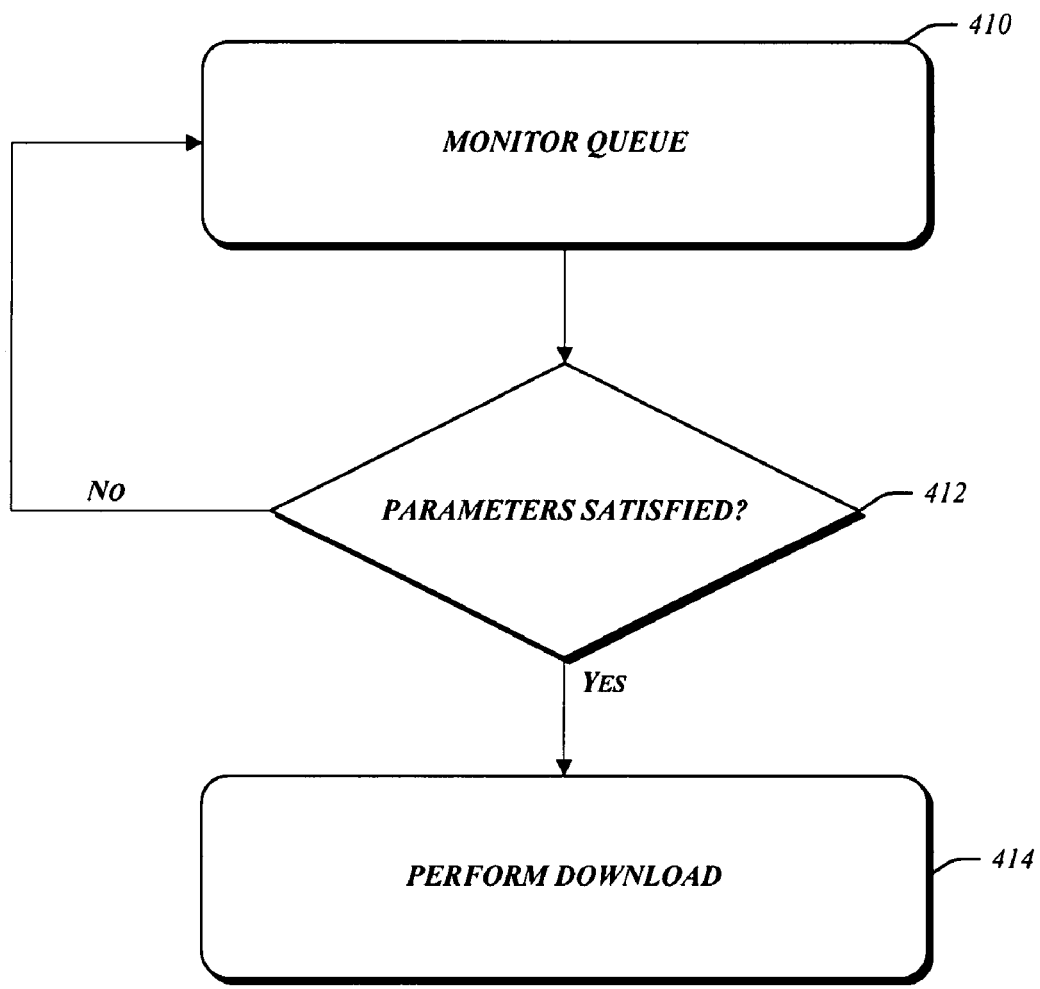
FIG. 4 is a flow diagram of a process for monitoring a queue of requests for downloading digital content.

Once the request has been received and entered into queue 216, queue monitor 224 operates to initiate the download of requested digital content items consistent with the parameters comprised in the request. FIG. 4 is a flow diagram of a process for downloading digital content. At step 410, queue monitor 224 continuously monitors the requests in queue 216 to determine whether the parameters associated with the request have been met. At step 412, queue monitor 224 determines whether the download parameters associated with each request in queue 216 have been satisfied. For example, queue monitor 224 may determine whether or not the time or period of time that is specified by the parameters has been satisfied. In another example, queue monitor 224 may determine whether or not the target communications device is in communication with the service. In still another example, queue monitor 224 determines whether or not the expected content item has been received into content database 210.

If the parameters are not satisfied, queue monitor 224 continues to check the parameters of the requests in queue 216. However, if at step 412, the parameters defined for the requested download are satisfied, at step 414, queue monitor 224 initiates the requested download. The download is performed consistent with the parameters defined for the request. For example, if the parameters defined that the content item is to be stored at a particular location in memory on the target device, the download will be performed as such. If the parameters define that the content item is to be downloaded during off-peak hours or during a period of low-bandwidth use, the download is performed at a time consistent with those parameters.

Example Computing Environment

Figure 5:
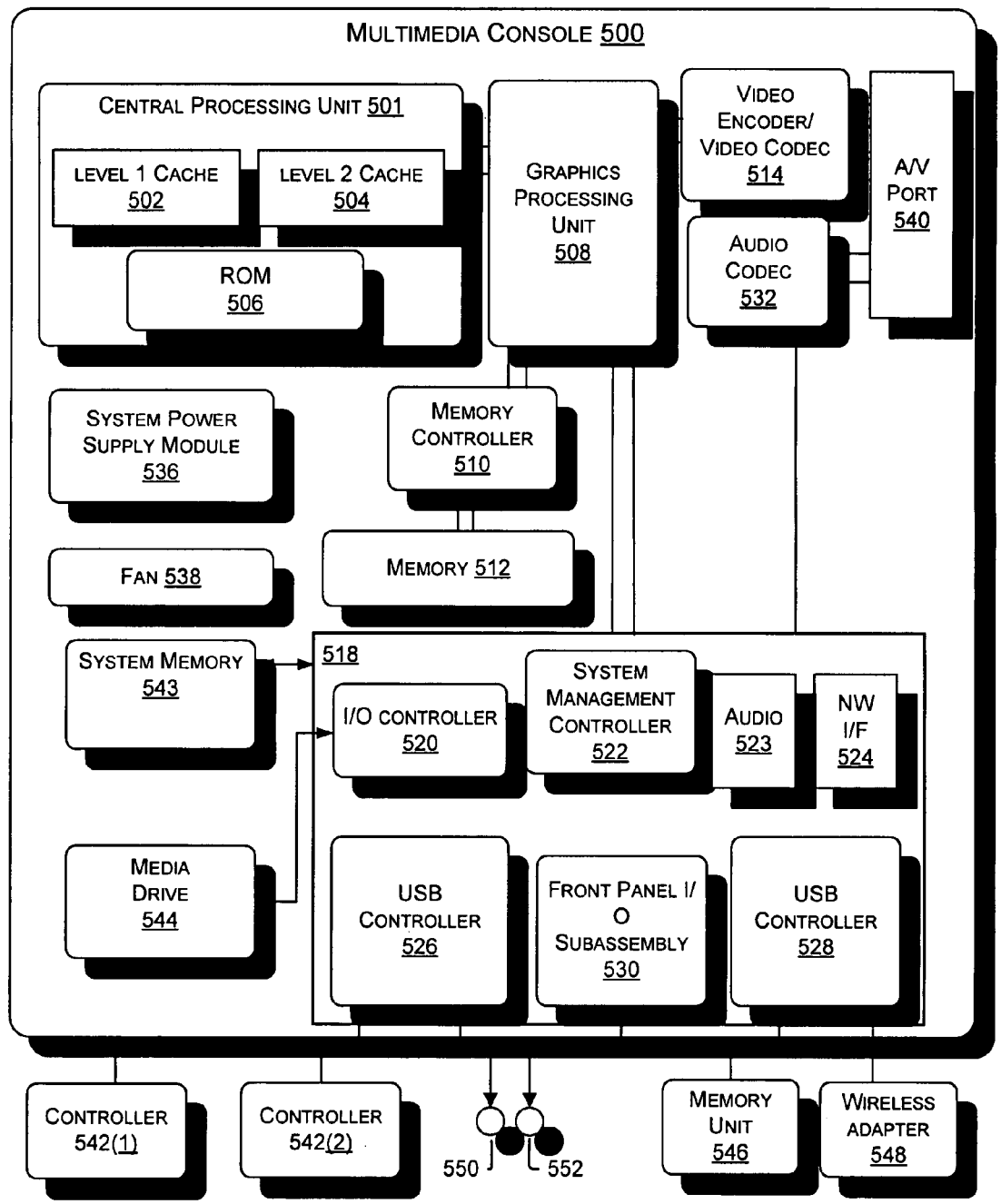
FIG. 5 is a block diagram of an illustrative console that may be suitable for incorporation into a network computing environment in which aspects of the subject matter described herein may be deployed.
Figure 6:
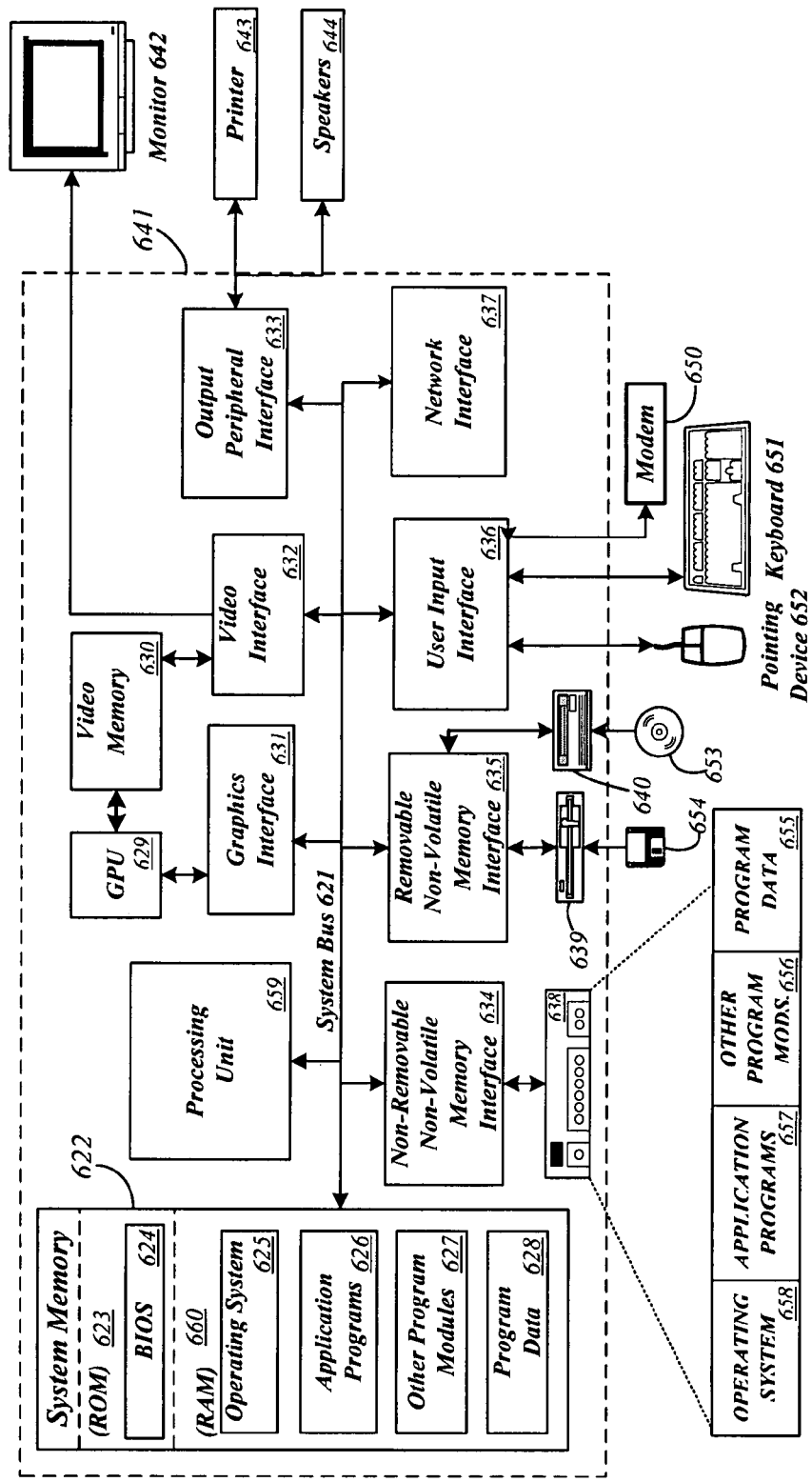
FIG. 6 is a block diagram of a computing environment with which aspects of the subject matter described herein may be deployed.

FIGS. 5 and 6 provide example computing systems that may be used in an exemplary computing arrangement to provide an illustrative service for managing downloads of purchased content.

FIG. 5 is a block diagram of an example game console 500 that may be used to access an illustrative service for managing downloads of purchased digital content as described above. Example game console 500 has a central processing unit (CPU) 501 having a level 1 (L1) cache 502, a level 2 (L2) cache 504, and a flash ROM (Read-only Memory) 506. The level 1 cache 502 and level 2 cache 504 temporarily store data and hence reduce the number of memory access cycles, thereby improving processing speed and throughput. The flash ROM 506 can store executable code that is loaded during an initial phase of a boot process when the game console 500 is initially powered. Alternatively, the executable code that is loaded during the initial boot phase can be stored in a FLASH memory device (not shown). Further, ROM 506 can be located separate from CPU 501. Game console 500 can, optionally, be a multi-processor system; for example game console 500 can have three processors 501, 503, and 505, where processors 503 and 505 have similar or identical components to processor 501.

A graphics processing unit (GPU) 508 and a video encoder/video codec (coder/decoder) 514 form a video processing pipeline for high speed and high resolution graphics processing. Data is carried from the graphics processing unit 508 to the video encoder/video codec 514 via a bus. The video processing pipeline outputs data to an A/V (audio/video) port 540 for transmission to a television or other display device. A memory controller 510 is connected to the GPU 508 and CPU 501 to facilitate processor access to various types of memory 512, such as, but not limited to, a RAM (Random Access Memory).

Game console 500 includes an I/O controller 520, a system management controller 522, an audio processing unit 523, a network interface controller 524, a first USB host controller 526, a second USB controller 528 and a front panel I/O subassembly 530 that may be implemented on a module 518. The USB controllers 526 and 528 serve as hosts for peripheral controllers 542(1)-542(2), a wireless adapter 548, and an external memory unit 546 (e.g., flash memory, external CD/DVD ROM drive, removable media, etc.). The network interface 524 and/or wireless adapter 548 provide access to a network (e.g., the Internet, home network, etc.) and may be any of a wide variety of various wired or wireless interface components including an Ethernet card, a modem, a Bluetooth module, a cable modem, and the like.

System memory 543 is provided to store application data that is loaded during the boot process. A media drive 544 is provided and may comprise a DVD/CD drive, hard drive, or other removable media drive, etc. The media drive 544 may be internal or external to the game console 500. When media drive 544 is a drive or reader for removable media (such as removable optical disks, or flash cartridges), then media drive 544 is an example of an interface onto which (or into which) media are mountable for reading. Application data may be accessed via the media drive 544 for execution, playback, etc. by game console 500. Media drive 544 is connected to the I/O controller 520 via a bus, such as a Serial ATA bus or other high speed connection (e.g., IEEE 3394). While media drive 544 may generally refer to various storage embodiments (e.g., hard disk, removable optical disk drive, etc.), game console 500 may specifically include a hard disk 552, which can be used to store game data, application data, or other types of data.

The system management controller 522 provides a variety of service functions related to assuring availability of the game console 500. The audio processing unit 523 and an audio codec 532 form a corresponding audio processing pipeline with high fidelity, 3D, surround, and stereo audio processing according to aspects of the present subject matter described herein. Audio data is carried between the audio processing unit 523 and the audio codec 526 via a communication link. The audio processing pipeline outputs data to the A/V port 540 for reproduction by an external audio player or device having audio capabilities.

The front panel I/O subassembly 530 supports the functionality of the power button 550 and the eject button 552, as well as any LEDs (light emitting diodes) or other indicators exposed on the outer surface of the game console 500. A system power supply module 536 provides power to the components of the game console 500. A fan 538 cools the circuitry within the game console 500.

The CPU 501, GPU 508, memory controller 510, and various other components within the game console 500 are interconnected via one or more buses, including serial and parallel buses, a memory bus, a peripheral bus, and a processor or local bus using any of a variety of bus architectures.

When the game console 500 is powered on or rebooted, application data can be loaded from the system memory 543 into memory 512 and/or caches 502, 504 and executed on the CPU 501. The application can present a graphical user interface that provides a consistent user experience when navigating to different media types available on the game console 500. In operation, applications and/or other media contained within the media drive 544 may be launched or played from the media drive 544 to provide additional functionalities to the game console 500.

The game console 500 may be operated as a standalone system by simply connecting the system to a television or other display. In this standalone mode, the game console 500 may allow one or more users to interact with the system, watch movies, listen to music, and the like. However, with the integration of broadband connectivity made available through the network interface 524 or the wireless adapter 548, the game console 500 may further be operated as a participant in a larger network community.

FIG. 6 is a block diagram representing an example computing environment 600. Example computing environment 600 may be used in a number of ways to implement the disclosed service for managing downloads of purchased content. For example, computing environment 600 may operate as a computer server to implement functional service 130 for managing downloads of purchased digital content. Computing environment 600 may operate as a user computing device 110a-c for accessing functional service over communications network 150.

Computing environment 600 is only one example of a suitable computing environment and is not intended to suggest any limitation as to the scope of use or functionality of the subject matter disclosed herein. Neither should the computing environment 600 be interpreted as having any dependency or requirement relating to any one or combination of components illustrated in the example operating environment 600.

Aspects of the subject matter described herein are operational with numerous other general purpose or special purpose computing system environments or configurations. Examples of well known computing systems, environments, and/or configurations that may be suitable for use with the subject matter described herein include, but are not limited to, personal computers, server computers, hand-held or laptop devices, portable media devices, multiprocessor systems, microprocessor-based systems, set top boxes, programmable consumer electronics, network PCs, minicomputers, mainframe computers, distributed computing environments that include any of the above systems or devices, and the like.

An example system for implementing aspects of the subject matter described herein includes a general purpose computing device in the form of a computer 641. Components of computer 641 may include, but are not limited to, a processing unit 659, a system memory 622, and a system bus 621 that couples various system components including the system memory to the processing unit 659. The system bus 621 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Computer 641 typically includes a variety of computer readable media. Computer readable media can be any available media that can be accessed by computer 641 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by computer 641. Communication media typically embodies computer readable instructions, data structures, program modules or other data in a modulated data signal such as a carrier wave or other transport mechanism and includes any information delivery media. The term "modulated data signal" includes a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer readable media.

The system memory 622 includes computer storage media in the form of volatile and/or nonvolatile memory such as read only memory (ROM) 623 and random access memory (RAM) 660. A basic input/output system 624 (BIOS), containing the basic routines that help to transfer information between elements within computer 641, such as during start-up, is typically stored in ROM 623. RAM 660 typically contains data and/or program modules that are immediately accessible to and/or presently being operated on by processing unit 659. By way of example, and not limitation, FIG. 6 illustrates operating system 625, application programs 626, other program modules 627, and program data 628.

Computer 641 may also include other removable/non-removable, volatile/nonvolatile computer storage media. By way of example only, FIG. 6 illustrates a hard disk drive 638 that reads from or writes to non-removable, nonvolatile magnetic media, a magnetic disk drive 639 that reads from or writes to a removable, nonvolatile magnetic disk 654, and an optical disk drive 640 that reads from or writes to a removable, nonvolatile optical disk 653 such as a CD ROM or other optical media. Other removable/non-removable, volatile/nonvolatile computer storage media that can be used in the example operating environment include, but are not limited to, magnetic tape cassettes, flash memory cards, digital versatile disks, digital video tape, solid state RAM, solid state ROM, and the like. The hard disk drive 638 is typically connected to the system bus 621 through a non-removable memory interface such as interface 634, and magnetic disk drive 639 and optical disk drive 640 are typically connected to the system bus 621 by a removable memory interface, such as interface 635.

The drives and their associated computer storage media discussed above and illustrated in FIG. 6, provide storage of computer readable instructions, data structures, program modules and other data for the computer 641. In FIG. 6, for example, hard disk drive 638 is illustrated as storing operating system 658, application programs 657, other program modules 656, and program data 655. Note that these components can either be the same as or different from operating system 625, application programs 626, other program modules 627, and program data 628. Operating system 658, application programs 657, other program modules 656, and program data 655 are given different numbers here to illustrate that, at a minimum, they are different copies. A user may enter commands and information into the computer 641 through input devices such as a keyboard 651 and pointing device 652, commonly referred to as a mouse, trackball or touch pad. Other input devices (not shown) may include a microphone, joystick, game pad, satellite dish, scanner, or the like. These and other input devices are often connected to the processing unit 659 through a user input interface 636 that is coupled to the system bus, but may be connected by other interface and bus structures, such as a parallel port, game port or a universal serial bus (USB). A monitor 642 or other type of display device is also connected to the system bus 621 via an interface, such as a video interface 632. In addition to the monitor, computers may also include other peripheral output devices such as speakers 644 and printer 643, which may be connected through an output peripheral interface 633.

Thus an on-line service for managing the distribution of digital content has been disclosed. The service allows users to request downloads to devices other than the device from which the request was made and to schedule the download for periods during which the target device does not receive heavy use.

It should be understood that the various techniques described herein may be implemented in connection with hardware or software or, where appropriate, with a combination of both. Thus, the methods and apparatus of the subject matter described herein, or certain aspects or portions thereof, may take the form of program code (i.e., instructions) embodied in tangible media, such as floppy diskettes, CD-ROMs, hard drives, or any other machine-readable storage medium wherein, when the program code is loaded into and executed by a machine, such as a computer, the machine becomes an apparatus for practicing the subject matter described herein.

In the case where program code is stored on media, it may be the case that the program code in question is stored on one or more media that collectively perform the actions in question, which is to say that the one or more media taken together contain code to perform the actions, but that—in the case where there is more than one single medium—there is no requirement that any particular part of the code be stored on any particular medium. In the case of program code execution on programmable computers, the computing device generally includes a processor, a storage medium readable by the processor (including volatile and non-volatile memory and/or storage elements), at least one input device, and at least one output device. One or more programs that may implement or utilize the processes described in connection with the subject matter described herein, e.g., through the use of an API, reusable controls, or the like. Such programs are preferably implemented in a high level procedural or object oriented programming language to communicate with a computer system. However, the program(s) can be implemented in assembly or machine language, if desired. In any case, the language may be a compiled or interpreted language, and combined with hardware implementations.

Although example embodiments may refer to utilizing aspects of the subject matter described herein in the context of one or more stand-alone computer systems, the subject matter described herein is not so limited, but rather may be implemented in connection with any computing environment, such as a network or distributed computing environment. Still further, aspects of the subject matter described herein may be implemented in or across a plurality of processing chips or devices, and storage may similarly be effected across a plurality of devices. Such devices might include personal computers, network servers, handheld devices, supercomputers, or computers integrated into other systems such as automobiles and airplanes.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed:

1. A method of managing digital content distribution implemented at least in part on a computing system, comprising:

maintaining access to a digital content store, the digital content store comprising digital content available for download and placeholders for digital content that is anticipated to become available in the future;

receiving a request from a first device to download a digital content item, the digital content item anticipated to become available in the future and having a placeholder in the digital content store;

receiving an identification of a second device to which the digital content item is to be downloaded;

receiving parameters associated with the request, the parameters specifying:

that a download is to be made during an interval of time;

that a download is to be made when the digital content item becomes available in the future;

that a download is to be made, during the interval of time, when the processing capacity of the device is sufficient and the communication bandwidth with the device is sufficient; and that the digital content item is to be stored at a particular location in memory on the second device;

placing an identification of the request, the second device, and the parameters associated with the request in a queue of received request;

monitoring the parameters associated with the request to identify when the digital content item is to be downloaded, the monitoring comprising determining whether the requested digital content item has been received into the digital content store; and downloading the digital content item to the second device consistent with the parameters associated with the request.

2. The method of claim 1,
wherein downloading the digital content item to the second device comprises downloading the digital content item during the interval of time.

3. The method of claim 1, further comprising:
maintaining the digital content store, the digital content store comprising a database of digital content items comprising a plurality of different types of digital content items,
wherein receiving a request from a first device to download a digital content item comprises receiving a request for a digital content item in the database of digital content items.

4. The method of claim 3, wherein the database of digital content items comprises at least a plurality of the following: music recordings; videos; and video games.

5. A computer readable storage device having instructions stored thereon that when executed by a computing system cause the computing system to perform operations comprising:
maintaining access to a digital content store, the digital content store comprising digital content available for download and placeholders for digital content that is anticipated to become available in the future;
maintaining a queue of requests to download digital content, said queue comprising for each request parameters for downloading requested digital content to a second device, the parameters specifying:
that a download is to be made during an interval of time;
that a download is to be made when the digital content item becomes available in the future;
that a download is to be made, during the interval of time, when the processing capacity of the device is sufficient and the communication bandwidth with the device is sufficient; and
that the digital content item is to be stored at a particular location in memory on the second device;
monitoring the queue to identify requests that are prepared for downloading consistent with the parameters for downloading requested digital content, the monitoring comprising determining whether the requested digital content item has been received into the digital content store; and
downloading digital content consistent with the parameters for downloading requested digital content.

6. The computer-readable storage device of claim 5, wherein maintaining a queue of requests to download digital content comprises centrally managing and maintaining a queue comprising for each request parameters specifying a time during which requested digital content is to be downloaded.

7. The computer-readable storage device of claim 5,
wherein maintaining access to a digital content store comprises maintaining a database of digital content,
wherein maintaining a queue of requests to download digital content comprises maintaining a queue of requests to download digital content from the database.

8. The computer-readable storage device of claim 7, wherein
downloading digital content consistent with the parameters for downloading requested digital content comprises downloading digital content during off-peak hours.

9. The computer-readable storage device of claim 5, further comprising
receiving new requests for digital content, said new requests comprising parameters for downloading requested digital content;
wherein maintaining a queue of requests comprises updating the queue of requests to reflect the new requests for digital content.

10. A system for managing downloads of digital content, comprising:
a digital content store, the digital content store comprising digital content available for download and placeholders for digital content that is anticipated to become available in the future;
a queue of requests to download digital content, said queue comprising for each request parameters for downloading requested digital content to a second device, the parameters specifying:
that a download is to be made during an interval of time;
that a download is to be made when the digital content item becomes available in the future;
that a download is to be made, during the interval of time, when the processing capacity of the device is sufficient and the communication bandwidth with the device is sufficient; and
that the digital content item is to be stored at a particular location in memory on the second device;
a device database comprising information about devices registered to receive downloads of digital content, the device database comprising for each device the type of content readable by the device, the format of the content suitable to be downloaded to the device, communications path with the device, and a storage location on the device at which data should be stored; and
a server in communication with said queue, said server programmed to identify request in the queue that are prepared to be downloaded and to initiate downloading requests that are identified as being prepared to be downloaded consistent with the parameters associated with the request, wherein identifying a request in the queue prepared to be downloaded comprises determining whether a requested digital content item has been received into the digital content store.

11. The system of claim 10, further comprising a second server in communication with said queue, said second server programmed to receive requests to download digital content items and add the requests to said queue.

12. The system of claim 11,
wherein the digital content store comprises a database of digital content items,
wherein said queue of requests to download digital content comprises a queue of requests to download items from said database of digital content items.

* * * * *